(12) United States Patent
Meng et al.

(10) Patent No.: US 10,288,801 B2
(45) Date of Patent: May 14, 2019

(54) BACKLIGHT MODULE AND DISPLAY APPARATUS INCLUDING THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Xiaoming Meng, Beijing (CN); Zhiyuan Zheng, Beijing (CN); Yufei Hu, Beijing (CN); Jie Cao, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 0 days.

(21) Appl. No.: 15/541,625

(22) PCT Filed: Jan. 4, 2017

(86) PCT No.: PCT/CN2017/070163
§ 371 (c)(1),
(2) Date: Jul. 5, 2017

(87) PCT Pub. No.: WO2017/206512
PCT Pub. Date: Dec. 7, 2017

(65) Prior Publication Data
US 2018/0203181 A1    Jul. 19, 2018

(30) Foreign Application Priority Data

Jun. 2, 2016  (CN) .................... 2016 2 0527786 U

(51) Int. Cl.
*F21V 8/00* (2006.01)

(52) U.S. Cl.
CPC ......... *G02B 6/0093* (2013.01); *G02B 6/0088* (2013.01); *G02B 6/0091* (2013.01)

(58) Field of Classification Search
CPC ... G02B 6/0093; G02B 6/0091; G02B 6/0088
(Continued)

(56) References Cited

U.S. PATENT DOCUMENTS

| 2011/0299006 A1* | 12/2011 | Cheng ............... G02F 1/133308 349/58 |
| 2013/0107171 A1* | 5/2013 | Lee ..................... G02B 6/0031 349/67 |

(Continued)

FOREIGN PATENT DOCUMENTS

| CN | 102043276 A | 5/2011 |
| CN | 103216790 A | 7/2013 |

(Continued)

OTHER PUBLICATIONS

Search Report for International Patent Application No/PCT/CN2017/070163 dated Mar. 31, 2017.

*Primary Examiner* — Laura K Tso
(74) *Attorney, Agent, or Firm* — Calfee, Halter & Griswold LLP

(57) ABSTRACT

A display apparatus including a backlight module is disclosed. The backlight module includes a back plate and a rubber frame located at a periphery of the back plate. The back plate has a protrusion facing towards the rubber frame. The rubber frame has a snap slot facing towards the back plate. The back plate and the rubber frame are connected to each other through meshing between the protrusion and the snap slot.

20 Claims, 2 Drawing Sheets

(58) Field of Classification Search
USPC ........................................ 362/633, 97.1–97.4
See application file for complete search history.

(56) References Cited

U.S. PATENT DOCUMENTS

| | | | | |
|---|---|---|---|---|
| 2013/0208208 A1* | 8/2013 | Li | ..................... | G02F 1/133308 |
| | | | | 349/58 |
| 2014/0321161 A1* | 10/2014 | Zhou | ..................... | G02B 6/0091 |
| | | | | 362/612 |
| 2015/0362787 A1* | 12/2015 | Yuan | ................. | G02F 1/133308 |
| | | | | 349/58 |
| 2016/0291386 A1* | 10/2016 | Wang | ........................ | G02B 6/00 |
| 2016/0342027 A1 | 11/2016 | Cao | | |
| 2017/0293167 A1* | 10/2017 | Shen | ..................... | G02F 1/1333 |

FOREIGN PATENT DOCUMENTS

| | | | |
|---|---|---|---|
| CN | 104570482 A | | 4/2015 |
| CN | 104808379 A | | 7/2015 |
| CN | 205750213 U | | 11/2016 |
| KR | 100499154 B1 | | 6/2005 |

\* cited by examiner

BACKLIGHT MODULE AND DISPLAY APPARATUS INCLUDING THE SAME

CROSS-REFERENCE TO RELATED APPLICATIONS

The present application is the U.S. national phase entry of PCT/CN2017/070163, with an international filing date of Jan. 4, 2017, which claims the benefit of Chinese Patent Application No. 201620527786.7, filed on Jun. 2, 2016, the entire disclosures of which are incorporated herein by reference.

TECHNICAL FIELD

The present disclosure relates to the field of display technology, and particularly to a backlight module and a display apparatus including the backlight module.

BACKGROUND

Backlight modules of conventional display apparatuses (e.g., an LCD in a laptop computer) include on a light incident side a back plate having a U-shaped bend, and a backlight source and a light guide plate are inserted in the U-shaped bend. This structure shows many drawbacks with a requirement for an increasingly thinner backlight module.

SUMMARY

In view of the above, the present disclosure proposes a backlight module, which seeks to solve one or more of the technical problems with the prior art.

According to certain exemplary embodiments, a backlight module is provided comprising a back plate and a rubber frame located at a periphery of the back plate. The back plate has a protrusion facing towards the rubber frame, the rubber frame has a snap slot facing towards the back plate, and the back plate and the rubber frame are connected to each other through meshing between the protrusion and the snap slot.

In some exemplary embodiments, a part of the rubber frame where the snap slot and the protrusion are both located on a light incident side of the backlight module.

In some exemplary embodiments, a surface of the rubber frame that faces towards the back plate has a bonding surface for bonding with the back plate.

In some exemplary embodiments, a double-sided adhesive tape is provided on the bonding surface.

In some exemplary embodiments, the rubber frame is provided with a carrying part on the light incident side, and the carrying part and the back plate form a space for receiving a backlight source and a part of a light guide plate.

In some exemplary embodiments, the protrusion is formed by extruding a part of the back plate.

In some exemplary embodiments, the part of the rubber frame where the snap slot is provided extends along an entire length of the backlight module on the light incident side.

In some exemplary embodiments, the protrusion of the back plate corresponding to the snap slot extends along the entire length of the backlight module on the light incident side.

In some exemplary embodiments, a reflective adhesive tape is provided at a position of the carrying part of the rubber frame opposed to the backlight source and/or the light guide plate.

In some exemplary embodiments, a surface of the carrying part facing away from the backlight source is used to carry a display panel to be arranged.

According to certain exemplary embodiments, a display apparatus is provided comprising the aforesaid backlight module.

In the backlight module and display apparatus according to embodiments of the present disclosure, a connection of the back plate and the rubber frame is achieved through the meshing therebetween, and the entire backlight source may be protected by way of the rubber frame, thereby enhancing stability and reliability of the device, improving uneven local stressing, and facilitating implementation of automated assembling. In addition, during the assembling of the backlight module, a gap between the backlight source and the light guide plate may absorb a possible expansion of the light guide plate in a high-temperature and high-humidity environment. This type of backlight module and display apparatus is particularly favorable for an application in laptop computers.

BRIEF DESCRIPTION OF THE DRAWINGS

The drawings are included to provide further understanding of embodiments, and are incorporated into the present specification. The drawings illustrate the embodiments and are used, together with the descriptions, to illustrate principles of the present disclosure. Other embodiments and many expected advantages of the embodiments will be easily recognized, which will become better understood by reference to the following detailed description. Elements in the drawings are not necessarily drawn to scale. Like reference signs refer to corresponding like parts.

DETAILED DESCRIPTION

In the following detailed description, reference is made to the accompanying drawings, which form a part of the detailed description and are shown through illustrative specific embodiments in which the present disclosure may be practiced. To this end, directional terms such as "top", "bottom", "left", "right", "up" and "down" are used with reference to orientations of the described drawings. The directional terms are used for purposes of illustration and not limitation, since parts of embodiments may be positioned in several different orientations. It should be appreciated that other embodiments may be used or logical changes may be made without departing from the scope of the present disclosure. The following detailed description should therefore not be taken in a limiting sense, and the scope of the present disclosure is defined by the appended claims.

Figure 1:
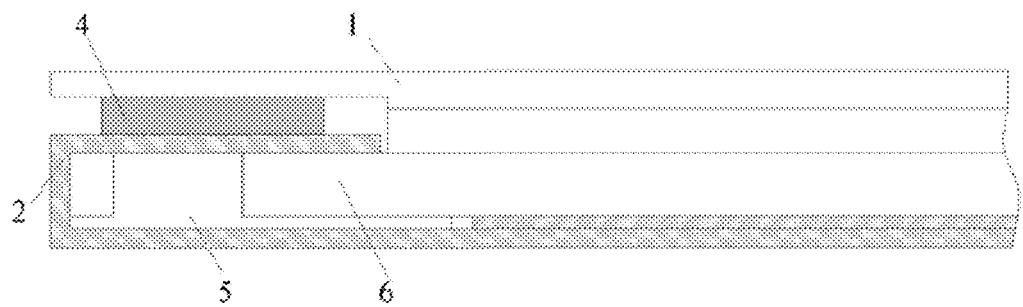
FIG. 1 illustrates a schematic cross-sectional view of a part of a backlight module in the prior art.
Figure 2:
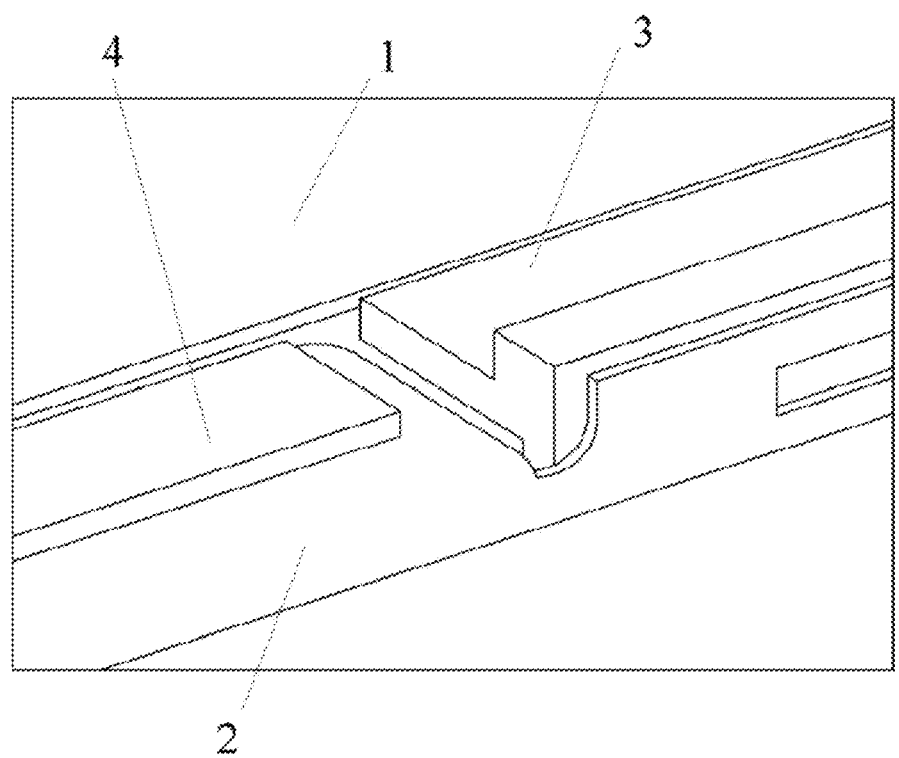
FIG. 2 illustrates a perspective view of a part of a backlight module in the prior art.

As shown in FIGS. 1 and 2, to meet the requirement for a thinned backlight module, a gap between a display panel 1 and the U-shaped bend 2 of the back plate becomes smaller and smaller, e.g., even smaller than a minimum thickness required by rubber frame molding. It is therefore impossible for the rubber frame 3 to extend on the U-shaped bend 2 of the back plate. A step between the rubber frame 3 and an upper surface of the U-shaped bend 2 of the back plate, as more clearly shown in FIG. 2, may cause unflatness and uneven stressing of the backlight module, thus placing the display panel at risk, for example, at risk of breaking down. Hence, in the prior art an adhesive tape pad 4 has to be provided to fill the step between the U-shaped bend 2 of the back plate and the rubber frame 3. However, the adhesive tape pad 4 has a physical property different from that of the rubber frame 3 and requires an extra mounting process, which is not conducive to mechanical stability of the structure. In addition, manual assembly is currently required in mounting a light bar 5 (namely, a backlight source) in the U-shaped bend. The U-shaped bend 2 is prone to deformation and unflatness when the thinned display apparatus is assembled manually, thereby affecting stability of internal structures. In addition, the light guide plate 6 tends to be disposed immediately close to the light bar 5 since the inside of the U-shaped bend 2 cannot be seen when the light bar 5 and the light guide plate 6 are assembled manually, which is not conducive to reliability in a high-temperature and high-humidity environment.

Figure 3:
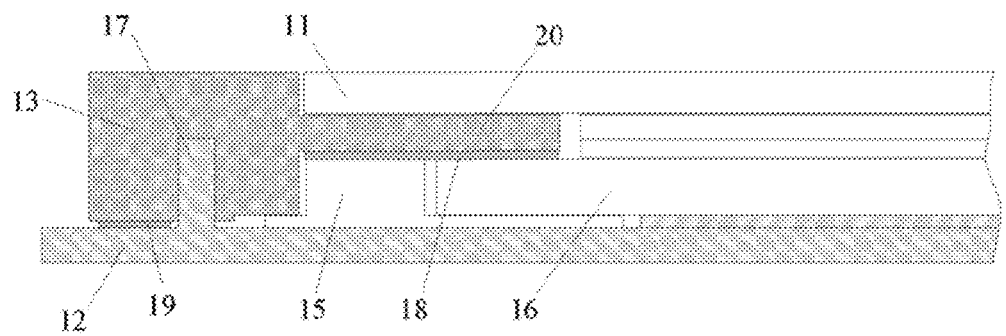
FIG. 3 illustrates a schematic cross-sectional view of a part of a backlight module according to an embodiment of the present disclosure.

FIG. 3 illustrates a schematic cross-sectional view of a part of a backlight module according to an embodiment of the present disclosure. FIG. 3 only shows a cross-sectional view of a part of the backlight module adjacent to a light incident side (namely, a side where the backlight source is located). The backlight module mainly comprises a back plate 12, a rubber frame 13 located on a periphery of the back plate, a backlight source 15, a light guide plate 16, and the like. Of course, for a display apparatus, the backlight module may be provided with members such as a display panel 11. Different from the back plate in the prior art, the back plate 12 in the backlight module does not employ a structure of a U-shaped bend, but has a protrusion 17. The protrusion 17 extends towards the rubber frame 13 thereabove. The rubber frame 13 is provided with a snap slot for mating with the protrusion 17. Fixing of the rubber frame 13 to the back plate 12 is achieved by engagement between the protrusion(s) 17 and the snap slot. It should be recognized that the shape and number of the protrusion 17 is not limited to those as shown in FIG. 3, and that the protrusion 17 may have other shapes suitable for meshing with the snap slot. More than one protrusion may be provided. In addition, the protrusion 17 may for example be integrally formed with the back plate 12, or they may be fabricated separately and then fixed together by way of, for example, welding. Due to this fixing of the rubber frame and the back plate, the thinner-oriented requirements of the backlight module may be better satisfied. Meanwhile, arrangement of the rubber frame at the periphery of the backlight module or even the display apparatus can be implemented so that the back plate is not prone to deformation during installation. This improves the structural stability of the display apparatus.

In particular, due to this simple and effective fixing of the rubber frame and back plate, the rubber frame may extend in a direction of an entire length of the backlight module on the light incident side, thereby functioning to protect the entire light incident side. In other words, the light incident side may be protected by employing a whole rubber frame, thereby eliminating the step present in the prior art.

In addition, a bonding surface 19 for bonding with the back plate may be provided at a surface of the rubber frame 13 facing towards the back plate 12. The bonding surface 19 is implemented, for example, with a double-sided adhesive tape or other bonding materials. Arrangement of the bonding surface 19 may further enhance connection strength between the rubber frame 13 and the back plate 12, improving the structural stability of the backlight module. In an alternative embodiment, an adhesive may be added on the protrusion 17 of the back plate or in the snap slot of the rubber frame to enhance the connection strength therebetween.

In a further embodiment, the rubber frame 13 further comprises a carrying part 20 for carrying the display panel 11 arranged thereon, that is, the display panel 11 is carried on a surface of the carrying part 20 away from the backlight source 15. The carrying part 20 and the back plate 17 form a space for receiving the backlight source 15 and a part of the light guide plate 16 so that the carrying part 20 protects the backlight source 15 and light guide plate 16. In an embodiment, the rubber frame 13 is pressed against a part of the backlight source 15 to function to fix the backlight source 15. In addition, a reflective adhesive tape 18 is provided at a position of the carrying part 20 opposed to the backlight source 15 and/or the light guide plate 16, which may enhance the light-emitting efficiency of the backlight module 15.

The backlight source 15 is for example a fluorescent tube (for an LCD display) or an LED.

Enhanced shielding of the backlight source 15 and reduced probability of light leakage are achieved due to the fact that the protrusion 17 in the back plate 12 may extend along the entire length of the backlight source 15 and that the backlight source 15 is concealed behind the protrusion 17 as viewed from the light incident side.

Figure 4:
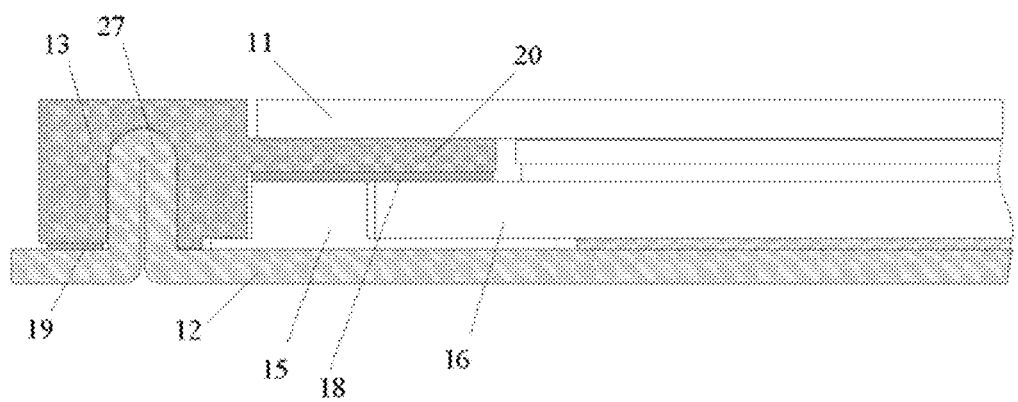
FIG. 4 illustrates a schematic cross-sectional view of a part of a backlight module according to another embodiment of the present disclosure.

FIG. 4 illustrates a schematic cross-sectional view of a part of a backlight module according to another embodiment of the present disclosure. Only the parts in the embodiment of FIG. 4 that are different from the embodiment shown in FIG. 3 are described here, with description of the identical or similar parts in these two embodiments being omitted.

The back plate 12 in the embodiment of FIG. 4 has a structure different from that of FIG. 3. It can be seen that a protrusion 27 in FIG. 4 is formed by extruding or bending a part of the back plate 12. As such, the protrusion 27 in FIG. 4 has a double-bend structure. The protrusion 27 formed in this way has a higher strength.

The embodiment shown in FIG. 4 is taken as an example to illustrate the assembling procedure of the backlight module according to an embodiment of the present disclosure.

Upon assembling, the backlight source 15 and the light guide plate 16 may first be placed properly on the back plate 12. At this time, since the space for mounting the backlight source 15 and light guide plate 16 is not shielded by other parts, it is easy to ensure presence of a gap between the backlight source 15 and the light guide plate 16 (as shown in FIGS. 3 and 4). The gap may resist against expansion of the light guide plate 16 in a high-temperature and high-humidity environment, thereby improving reliability of the backlight module. In contrast, in the prior art as shown in FIG. 1, such a gap may be absent between the backlight source and the light guide plate, which tend to be disposed immediately close to each other because the inside of the U-shaped bend cannot be clearly seen when the backlight source and the light guide plate are being mounted.

After the backlight source 15 and the light guide plate 16 are mounted properly, a reflective adhesive tape 18 may be disposed on the backlight source 15 and a part of the light guide plate 16. Then, the rubber frame 13 is pressed against the back plate 12 by meshing the snap slot in the rubber frame 13 with the protrusion 27 on the back plate 12, and the carrying part 20 can be pressed against the reflective adhesive tape 18 so that the backlight source and the light guide plate 16 can be well protected by the carrying part 20.

Optionally, the bonding surface 19 may further be provided at a position where the rubber frame 13 and the back plate 12 are in contact with each other, to improve the connection strength therebetween.

Thereafter, members such as a display panel may be mounted on the resultant backlight module to finalize the assembling of the whole display apparatus. It can be seen that the whole mounting procedure is controllable, and automated operation may be achieved, thereby eliminating the drawback caused by the presence of the U-shaped bend structure in the prior art.

Specific embodiments of the present disclosure have been described above, to which the protection scope of the present disclosure is however not limited. Variations and substitutions readily envisaged by those skilled in the art within the technical scope revealed by the present disclosure should be encompassed in the protection scope of the present disclosure. Hence, the protection scope of the present disclosure should be subject to the claims.

In the description of the present disclosure, it is to be appreciated that orientations or positional relationships indicated by terms such as "up", "down", "inside" and "outside" are based on the orientations or positional relationships shown in the drawings to facilitate and simplify the description of the present disclosure, not to indicate or imply that the means or elements involved should have specific orientations, or be constructed and operated with specific orientations, and therefore should not be construed as limiting of the present disclosure. The word "comprise" does not exclude existence of elements or steps not listed in the claims. The word "a" or "an" preceding an element does not exclude existence of a plurality of such elements. The mere fact that certain measures are recited in mutually different dependent claims does not indicate that a combination of these measures cannot be used to advantage. Any reference sign in the claims should be construed as limiting the scope.

LISTINGS OF THE REFERENCE SIGNS

1: display panel;
2: back plate;
3: rubber frame;
4: adhesive tape pad;
5: backlight source;
6: light guide plate;
11: display panel;
12: back plate;
13: rubber frame;
15: backlight source;
16: light guide plate;
17: protrusion;
18: reflective adhesive tape;
19: bonding surface;
20: carrying part;
27: protrusion.

What is claimed is:

1. A backlight module for a display panel, the display panel comprising a display surface for presenting thereon an image, the backlight module comprising:
a back plate, comprising a main surface arranged in parallel to the display surface of the display panel; and
a rubber frame located at a periphery of the back plate, wherein the back plate further comprises a protrusion facing towards the rubber frame in a direction perpendicular to the main surface, wherein the rubber frame comprises a snap slot facing towards the back plate in the direction perpendicular to the main surface, and wherein the back plate and the rubber frame are connected to each other through meshing between the protrusion and the snap slot.

2. The backlight module of claim 1, wherein the snap slot and the protrusion are both located on a light incident side of the backlight module.

3. The backlight module of claim 1, wherein a surface of the rubber frame facing towards the back plate has a bonding surface for bonding with the back plate.

4. The backlight module of claim 3, further comprising a double-sided adhesive tape provided on the bonding surface.

5. The backlight module of claim 2, wherein the rubber frame is provided with a carrying part on the light incident side, and wherein the carrying part and the back plate form a space for receiving a backlight source and a part of a light guide plate.

6. The backlight module of claim 1, wherein the protrusion is formed by extruding a part of the back plate.

7. The backlight module of claim 2, wherein a part of the rubber frame where the snap slot is provided extends along an entire length of the backlight module on the light incident side.

8. The backlight module of claim 7, wherein the protrusion of the back plate corresponding to the snap slot extends along the entire length of the backlight module on the light incident side.

9. The backlight module of claim 5, further comprising a reflective adhesive tape provided at a position of the carrying part of the rubber frame opposed to at least one of the backlight source or the light guide plate.

10. The backlight module of claim 5, wherein a surface of the carrying part facing away from the backlight source is used to carry the display panel.

11. A display apparatus comprising: the backlight module as claimed in claim 1.

12. The backlight module of claim 2, wherein the protrusion is formed by extruding a part of the back plate.

13. The backlight module of claim 3, wherein the protrusion is formed by extruding a part of the back plate.

14. The backlight module of claim 4, wherein the protrusion is formed by extruding a part of the back plate.

15. The backlight module of claim 5, wherein the protrusion is formed by extruding a part of the back plate.

16. A display apparatus comprising: the backlight module as claimed in claim 2.

17. A display apparatus comprising: the backlight module as claimed in claim 3.

18. A display apparatus comprising: the backlight module as claimed in claim 4.

19. A display apparatus comprising: the backlight module as claimed in claim 5.

20. A display apparatus comprising: the backlight module as claimed in claim 6.

* * * * *